US010336553B2

(12) United States Patent
Unterseher et al.

(10) Patent No.: US 10,336,553 B2
(45) Date of Patent: Jul. 2, 2019

(54) METHOD AND HANDLING DEVICE

(71) Applicant: KRONES Aktiengesellschaft, Neutraubling (DE)

(72) Inventors: Josef Unterseher, Rohrdorf (DE); Michael Hartl, Raubling (DE)

(73) Assignee: Krones Aktiengesellschaft, Neutraubling (DE)

( * ) Notice: Subject to any disclaimer, the term of this patent is extended or adjusted under 35 U.S.C. 154(b) by 0 days.

(21) Appl. No.: 15/737,381

(22) PCT Filed: May 23, 2016

(86) PCT No.: PCT/EP2016/061583
§ 371 (c)(1),
(2) Date: Dec. 18, 2017

(87) PCT Pub. No.: WO2016/202532
PCT Pub. Date: Dec. 22, 2016

(65) Prior Publication Data
US 2018/0170684 A1    Jun. 21, 2018

(30) Foreign Application Priority Data

Jun. 18, 2015   (DE) .......................... 10 2015 109 734

(51) Int. Cl.
*B65G 47/08*    (2006.01)
*B65B 35/36*    (2006.01)
(Continued)

(52) U.S. Cl.
CPC ............ *B65G 47/082* (2013.01); *B65B 35/36* (2013.01); *B65B 35/44* (2013.01); *B65B 35/54* (2013.01);
(Continued)

(58) Field of Classification Search
CPC ...... B65G 47/082; B65G 47/26; B65G 47/32; B65B 35/36; B65B 35/44; B65B 35/54
(Continued)

(56) References Cited

U.S. PATENT DOCUMENTS 3,216,173 A    11/1965  Anderson
4,182,442 A *   1/1980  Jones .................. B65G 57/035
                                                        198/418.3
(Continued)

FOREIGN PATENT DOCUMENTS

CN    102241281 A    11/2011
CN    203832801 U     9/2014
(Continued)

OTHER PUBLICATIONS

German Application No. DE 10 2015 109 734.6 Filed Jun. 18, 2015—German Search Report dated Feb. 25, 2016.
(Continued)

*Primary Examiner* — William R Harp
(74) *Attorney, Agent, or Firm* — Simmons Perrine Moyer Bergman PLC (57) ABSTRACT

The invention is a method and device for reducing bundles (2) being conveyed in a transport direction (TR) in n rows (3) to a smaller number of continuing transport rows, in particular to (n−1) or (n−2) or (n−3) continuing transport rows (3-1, 3-3). A space (8) is formed at least between the individual bundles (2) of at least one incoming and continuing transport row (3-1, 3-3). The size of the space (8) corresponds to at least the value of a longitudinal extent of an individual article or of an individual group (2) in transport direction (TR). At least two bundles (2) of the at least one row (3-2) are transferred simultaneously by a gripper (10) into a number of consecutive spaces (8) between bundles (2) of a continuing transport row (3-1, 3-3) adjacent to the row (3-2).

16 Claims, 4 Drawing Sheets

(51) Int. Cl.
*B65B 35/44* (2006.01)
*B65B 35/54* (2006.01)
*B65B 59/00* (2006.01)
*B65G 47/32* (2006.01)
*B65G 47/26* (2006.01)
*B65B 35/16* (2006.01)
*B65B 35/24* (2006.01)

(52) U.S. Cl.
CPC ............ *B65B 59/005* (2013.01); *B65G 47/26* (2013.01); *B65G 47/32* (2013.01); *B65B 35/16* (2013.01); *B65B 35/24* (2013.01)

(58) Field of Classification Search
USPC .................................................. 198/432, 436
See application file for complete search history.

(56) References Cited

U.S. PATENT DOCUMENTS

| | | |
|---|---|---|
| 4,799,351 A | 1/1989 | Blanda |
| 4,901,502 A | 2/1990 | Colamussi |
| 5,771,658 A | 6/1998 | Olson et al. |
| 6,092,979 A | 7/2000 | Miselli |
| 7,374,033 B2 * | 5/2008 | Monti .................... B65G 47/52 198/429 |
| 8,776,984 B2 * | 7/2014 | Monti .................... B65B 35/38 198/432 |
| 9,604,792 B2 * | 3/2017 | Wipf ..................... B65G 47/082 |
| 2017/0203865 A1 * | 7/2017 | Kalany .................. B65B 35/58 |

FOREIGN PATENT DOCUMENTS

| | | |
|---|---|---|
| DE | 1511849 | 1/1970 |
| DE | 298224 A5 | 2/1992 |
| DE | 20201419 | 6/2002 |
| DE | 102013219847 | 2/2015 |
| EP | 2792626 | 4/2015 |

OTHER PUBLICATIONS

PCT Application No. PCT/EP2016/061583 Filed May 23, 2016—International Search Report dated Aug. 24, 2016.
PCT/EP2016/061583—International Preliminary Report on Patentability dated Dec. 19, 2017.
Corresponding Chinese Patent Application—First Office Action dated Feb. 25, 2019.

* cited by examiner

METHOD AND HANDLING DEVICE

CLAIM OF PRIORITY

The present application is a national stage application of International Application PCT/EP2016/061583, filed on May 23, 2016, which in turn claims priority to German Application DE 10 2015 109 734.6, filed on Jun. 18, 2015, all of which are incorporated by reference.

FIELD OF THE INVENTION

The present invention relates to a method and a handling device for regrouping articles or, as the case may be, for regrouping article groups.

BACKGROUND OF THE INVENTION

It is a frequent necessity in the packaging industry to regroup articles and/or sets of articles, bundles, or the like, which arrive in a plurality of parallel lanes, to an arrangement that is appropriate and required for the subsequent processing steps. For instance, it may be necessary to reduce bundle streams arriving in n parallel rows to (n−1) or (n−2) rows of bundle streams for further processing.

According to the prior known art, it is necessary in this context to create spaces in each instance between the individual bundles on the continuing transport lane in order to accommodate the bundles from the lane to be broken up in these spaces between the bundles of the transport lane. If two lanes are to be merged to one single lane, for example, it is necessary to form a space in each instance between consecutive bundles in the transport lane, with each space being at least as long as one bundle. After the bundles have been divided and accordingly the spaces have been formed, it is possible to push always one bundle from the lane to be broken up into a space between consecutive bundles of the continuing transport lane. In this solution, an appropriate handling device or gripping device handles and shifts always only one bundle a time. The output of such a device is accordingly low. It is possible to design the dividing process such that it is continuous.

It is furthermore known from the prior art that the bundles arriving in a stream are divided into so-called bundle groups. A specified number of bundles is then divided off as a bundle group. The bundle group is followed by an appropriate space, with the length of the space corresponding to at least the length of the bundle group. In this way a space is formed in each instance between two consecutive bundle groups, with the space having at least the length of one bundle group in transport direction. After the bundle groups have been divided and accordingly after the spaces have been formed, it is possible to push always one bundle group from the lane to be broken up into a space between consecutive bundle groups of the continuing transport lane. In this solution, an appropriate handling device or gripping device in each instance handles and shifts a bundle group, that is to say that a plurality of bundles is always divided up, and a space is produced between the bundle groups, with the space being appropriately dimensioned so that it is possible to shift a bundle group with the same number of bundles from the lane to be broken up into the transport lane. This is not a continuous, but rather a pulsating dividing process.

SUMMARY OF THE INVENTION

An object of the invention is to achieve a high output in regrouping bundle streams from a continuous infeed of bundles.

The invention relates to a method for regrouping articles or, as the case may be, for regrouping article groups, being delivered in n rows, or, as the case may be, it relates to a method for regrouping bundle streams from a continuous infeed. In the method, it is in particular provided that articles or article groups being conveyed in a transport direction and at a transport speed in n rows are reduced to a smaller number of continuing transport rows, in particular, to (n−1) or (n−2) or (n−3) continuing transport rows, because, for instance, the following machine can only process a smaller number of parallel rows of articles or article groups. Below, the term "bundle" will be used to refer to individual "articles" and/or "article groups".

It is necessary for the method that at least the bundles being transported in a continuing transport row are in each instance spaced apart from each other. That is to say that a space is formed in each instance between consecutive bundles from an incoming and subsequently continuing transport row. The space between the individual bundles within a transport row, that is, the length or size of the space between two bundles, corresponds to at least a longitudinal extent of a bundle in transport direction. The space thus has a size that is sufficient for a further bundle to be disposed into the space.

The bundles can come from the previous processing machine already accordingly spaced apart such that it is not necessary to adjust the spaces between the bundles within a row. More frequently, however, the bundles will arrive in the handling device without being spaced apart from each other or with the wrong spaces to each other, in particular with a space that is too small or too large. In this instance it is necessary to dispose a divider or another suitable device upstream of the handling device, with the divider or other suitable device producing the required even arrangement and/or spacing of the bundles within the rows.

At least the bundles of the continuing transport row must be disposed at regular spaces to each other. According to a preferred embodiment, both the bundles of the at least one row to be broken up and the bundles of at least one adjacent continuing transport row are disposed at regular spaces to each other.

The method provides that at least two bundles of a row to be broken up are transferred simultaneously into a number of consecutive spaces between consecutive bundles of a continuing transport row that is adjacent, in particular parallel, to the row to be broken up, the number of consecutive spaces corresponding to the number of bundles.

According to one embodiment of the invention, the at least two bundles of the at least one row to be broken up are gripped simultaneously and shifted into a corresponding number of consecutive spaces within the continuing transport row. In this context, it is provided that the speed at which the at least two bundles are moved is slowed down in relation to the transport speed of the bundles of the continuing transport row. It can be alternatively provided that the speed at which the at least two bundles are moved is increased in relation to the transport speed of the bundles of the continuing transport row.

Furthermore, an additional directional component perpendicular to the transport direction can be applied upon the at least two bundles of the row to be broken up such that the bundles are transferred from a first starting position in the row to be broken up into a second end position in consecutive spaces between adjacent bundles of the continuing transport row.

The regrouped bundles are subsequently further transported within the continuing transport row at the original transport speed. In particular, the regrouped bundles are moved within the continuing transport row at the transport speed of the transport device.

The invention relates to a handling device for reducing bundles being conveyed on a transport device in a transport direction and at a transport speed in n rows to a smaller number of continuing transport rows, in particular to (n−1) or (n−2) or (n−3) continuing transport rows. The handling device is, in particular, provided for carrying out the above-described method. The handling device is designed such that it is used for repositioning at least two bundles from a row to be broken up in such a way that the incoming bundles in a first number of n rows are subsequently passed on to further processing machines in a second, reduced number of, for example, (n−1) or (n−2) or (n−3) continuing transport rows.

As already described above, at least the bundles in the at least one continuing transport row must in each instance have a specified space to each other, the space always being approximately identical and, in particular, of a specified size.

The handling device comprises a gripper that grips simultaneously at least two bundles of a row to be broken up. The at least two bundles are subsequently transferred by the gripper to at least two consecutive spaces between consecutive bundles of a parallel, adjacent, continuing transport row. The arriving bundles are spaced apart from each other in the parallel, continuing transport row. In particular, the bundles from the row to be broken up are inserted between the bundles of the continuing transport row and a compacted bundle arrangement is thus produced within the continuing transport row.

According to one embodiment of the invention, each gripper comprises at least two gripping units for the simultaneous gripping of at least two bundles of the row to be broken up.

According to a first embodiment of the invention, it is provided that the bundles within the at least one row to be broken up have the same space to each other as the bundles in the at least one incoming and subsequently continued parallel transport row. The gripper grips simultaneously at least two bundles of the row to be broken up while maintaining the space between the bundles. With the space being maintained, the at least two bundles are subsequently transferred by the gripper to at least two consecutive spaces between the spaced, consecutive bundles of a parallel, adjacent, continuing transport row. In particular, the bundles from the row to be broken up are thus inserted between the bundles of the continuing transport row and a compacted bundle arrangement is thus produced for the continuing transport row.

According to a further embodiment of the invention, it can be provided that the bundles within the at least one row to be broken up have a differing space or largely no space to each other. The at least two bundles are gripped by the at least two gripping units of the gripper. The gripping units are variably adjustable in relation to each other. In particular, it can be provided that the bundles are gripped by the gripper, that the space between the bundles is adjusted by readjusting the at least two gripping units of the gripper in relation to each other, and that the bundles are pushed over into the continuing transport row and correspondingly integrated into the consecutive spaces between the incoming bundles in the continuing transport row.

Another embodiment provides that the gripper comprises two gripping surfaces disposed opposite each other, between which the at least two bundles are held that have been gripped from the row to be broken up. The space of the gripping surfaces to each other is, in particular, adjustable; the gripping surfaces are, for example, each mounted at an axis of rotation so as to be swivelably movable. The axes of rotation of are aligned parallel to the transport direction. By swiveling the gripping surfaces in opposite directions about their particular axis of rotation, the gripping surfaces can be moved toward each other or away from each other. In this way, the bundles can be fixed or released by the gripping surfaces.

The gripping surfaces are each subdivided into at least two gripping areas each, and they are preferably designed to be mirror-inverted to each other. In each instance two gripping areas directly opposite each other of the gripping surfaces located opposite each other thus form a gripping unit for a bundle.

It is furthermore provided that the gripping areas of a gripping surface are spaced apart from each other. The space between the gripping areas of a gripping surface in transport direction corresponds to about the length of a space between the bundles within a row. The gripping areas themselves have a length parallel to the transport direction corresponding to about the longitudinal extent of the bundles in transport direction. The bundles are thus each held between gripping areas located opposite each other and using a large surface area. It is thereby ensured that the at least two bundles do not twist or the like, but rather reliably maintain their original alignment and arrangement in relation to each other while the at least two bundles are being shifted by the gripper on the transport surface of the transport device.

An opening is preferably formed in the region of the spacing of two gripping areas of a gripping surface, with the size of the opening corresponding to at least a maximum cross section of the bundle in a plane parallel to the transport direction.

The gripper is disposed above the transport device. For the purpose of gripping at least two bundles from the row to be broken up, the gripper is lowered from above the bundles and positioned such that the at least two bundles are each arranged in between the at least two gripping units. A first bundle is, in particular, positioned in between a first gripping unit of the gripper; furthermore, a second bundle is positioned between a second gripping unit of the gripper; etc. The gripping surfaces or, as the case may be, the gripping areas of the gripping surfaces, are subsequently pressed against the bundles, and the bundles are thus each held by the associated gripping units of the gripper. While the gripper is lowered and positioned and the bundles are fixed in between the gripping units, it can be necessary for the gripper to move along at transport speed in transport direction. In order to subsequently regroup the at least two bundles, it is necessary to change a movement speed of the bundles in relation to the transport speed, that is, either to increase or else to reduce the movement speed. It is furthermore necessary to apply a movement component perpendicular to the transport direction upon the bundles in order to shift the bundles toward the continuing transport row and, in particular, into the spaces between the bundles of the continuing transport row.

According to one embodiment of the invention, the gripping surfaces are formed by exchangeable format parts. The format parts are, in particular, fastened to the gripper by way of a quick-lock mechanism. By exchanging the format parts, it is possible to quickly and easily adapt the gripper to different bundle formats, for example, to different bundle sizes or the like. In the instance of a product change, the device can be quickly and easily adapted to the new product, for example.

According to one embodiment of the invention, the gripper has a rotation device. By the rotation device, the at least two articles or article groups or bundles that are being held by the gripper can be rotated while they are transferred to the adjacent, continuing transport row. Particularly preferentially, the gripper has a plurality of rotation device. Each gripping unit has a rotation device associated with it. The rotation device can be controllable individually such that each bundle of the row to be broken up can be individually rotated while being transferred to the adjacent, continuing transport row.

In summary, the bundles are divided up such that a space is formed after each bundle, with the space being sufficiently large to insert a further bundle into this space. According to one embodiment, the bundles run synchronously with each other in all rows or, as the case may be, are aligned with each other. A plurality of bundles in the row to be broken up is gripped by a spaced gripper. The gripper is always located above the bundles; the gripping surfaces are only lowered or, as the case may be, swiveled downward or the like in that region where the bundles are to be gripped. The gripped bundles are inserted into the spaces between the bundles of the continuing transport row.

In this way it is possible to achieve a particularly high output in regrouping the bundle streams, in particular with a continuous infeed of bundles. The device can be implemented with only few robots or the like.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION OF THE INVENTION

The same or equivalent elements of the invention are designated using identical reference characters. Furthermore and for the sake of clarity, only the reference characters relevant for describing the individual figures are provided. It should be understood that the detailed description and specific examples of the embodiments of the device and of the method according to the invention are intended for purposes of illustration only and are not intended to limit the scope of the invention.

FIGS. 1 to 7 schematically show the procedure for regrouping bundles 2 that arrive in three lanes into bundles 2 that leave in two lanes, the regrouping being carried out by a handling device 1 The bundles 2 either arrive in transport direction TR already spaced apart from each other coming from a machine previously handling the bundles 2, for example from a shrink tunnel or the like, via a transport device 5, for example a conveyor belt 6, a modular belt conveyor, or the like, and they are transferred toward a further processing device 7. Alternatively, the bundles 2 are delivered, for example, in a mass flow (not illustrated) and are divided up in three parallel rows 3-1, 3-2, and 3-3 by a divider device 4, which is only schematically indicated. In this context, spaces 8 are formed in each instance between the individual bundles 2 in each of the parallel rows 3-1, 3-2, 3-3. Subsequently, the bundle rows that are interrupted by spaces 8 are moved in transport direction TR on the transport surface TE of the transport device 5.

The bundles 2 have a first longitudinal extent or a first length L2 in transport direction TR. The spaces 8 have a second longitudinal extent or a second length L8 in transport direction TR. The second length L8 of the spaces 8 corresponds to at least the first length L2 of the bundles 2. Preferably, the second length L8 of the spaces 8 corresponds to at least 110% of the first length L2 of the bundles 2.

The bundles 2 in an entry area EB of the handling device 1 are divided such that a space 8 is formed after each bundle 2, with the space 8 being formed sufficiently large for being able to insert a further bundle 2 into the space 8.

The bundles 2 run synchronously with each other in all lanes or, as the case may be, in all parallel rows 3-1, 3-2, 3-3, or, as the case may be, they are aligned with each other.

In the present exemplary embodiment, the three-rowed transport in the three rows 3-1, 3-2, 3-3 is transferred to a two-rowed transport in the rows 3-1 and 3-3. Three bundles 2 in the row to be broken up 3-2 are, in the process, gripped by a so-called spaced gripper 10. The gripper 10 is formed such that it holds simultaneously three bundles 2 arriving in the middle row 3-2, which is to be broken up, and shifts them into an adjacent row 3-1 or 3-3 such that the three bundles 2 being held by the gripper 10 are each inserted into the spaces 8 between bundles 2 of the particular continuing row 3-1 or 3-3.

In the FIGS. 1 to 7, it is, in particular, illustrated how three bundles 2-2a, 2-2b, and 2-2c from the middle parallel row 3-2, which is to be broken up, are simultaneously inserted by a gripper 10 into the three spaces 8 between the four bundles 2-1a, 2-1b, 2-1c, and 2-1d of the outer parallel row 3-1. In the process, a bundle arrangement 9 (cf. FIG. 7) results within the continuing row or, as the case may be, within the transport row 3-1, in which bundle arrangement 9 a bundle 2-2 from the middle parallel row 3-2, which is to be broken up, and a bundle 2-1 from the outer row 3-1 are alternately disposed one after the other in transport direction TR.

In a next method step not illustrated here, the next three bundles 2-2 arriving in the middle row 3-2 are in each instance inserted between bundles 2-3 of the other outer, continuing row 3-3.

Figure 1:
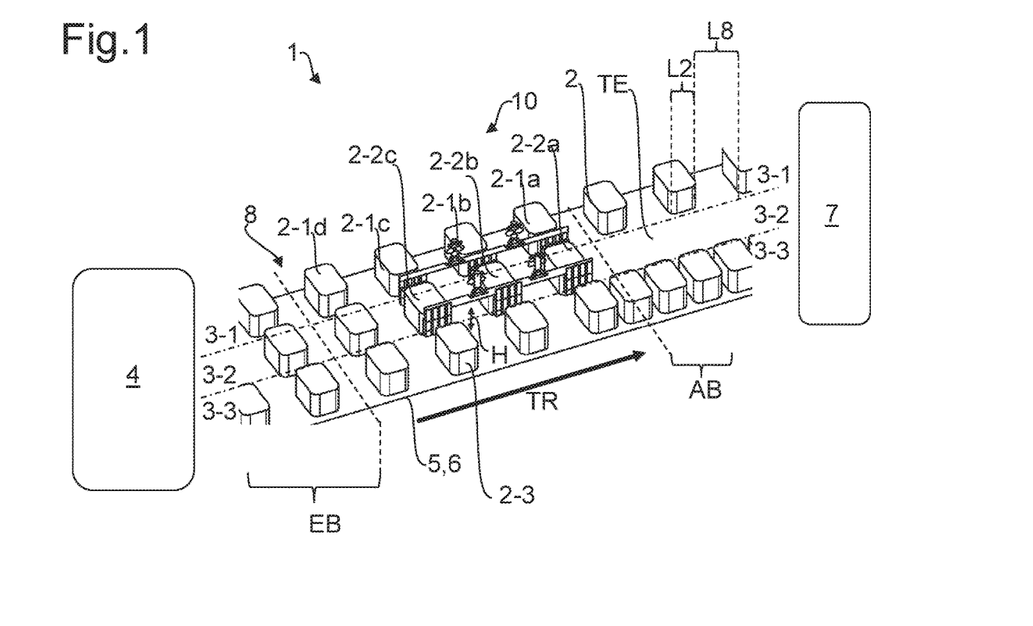
FIGS. 1 to 7 schematically show the procedure for regrouping bundles that arrive in three lanes into bundles that leave in two lanes.
Figure 2:
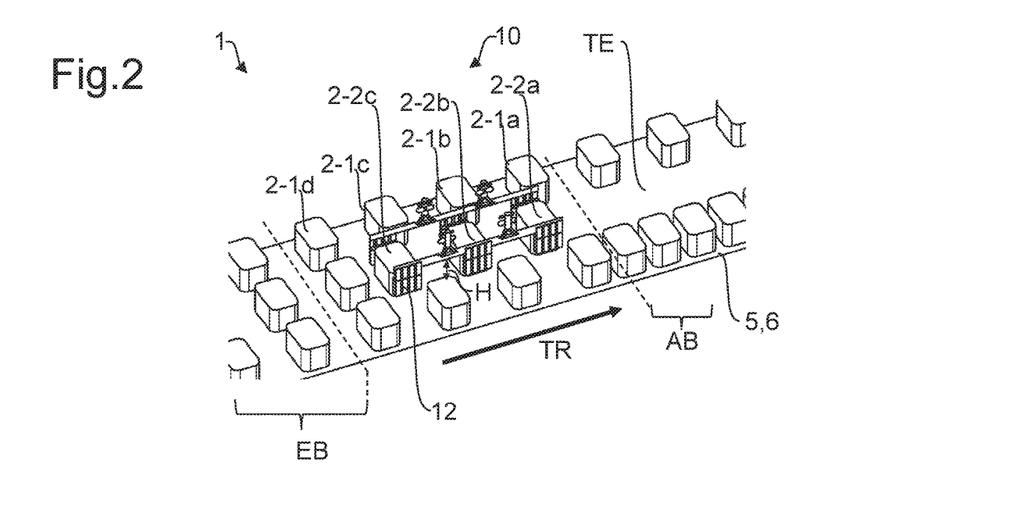
Figure 3:
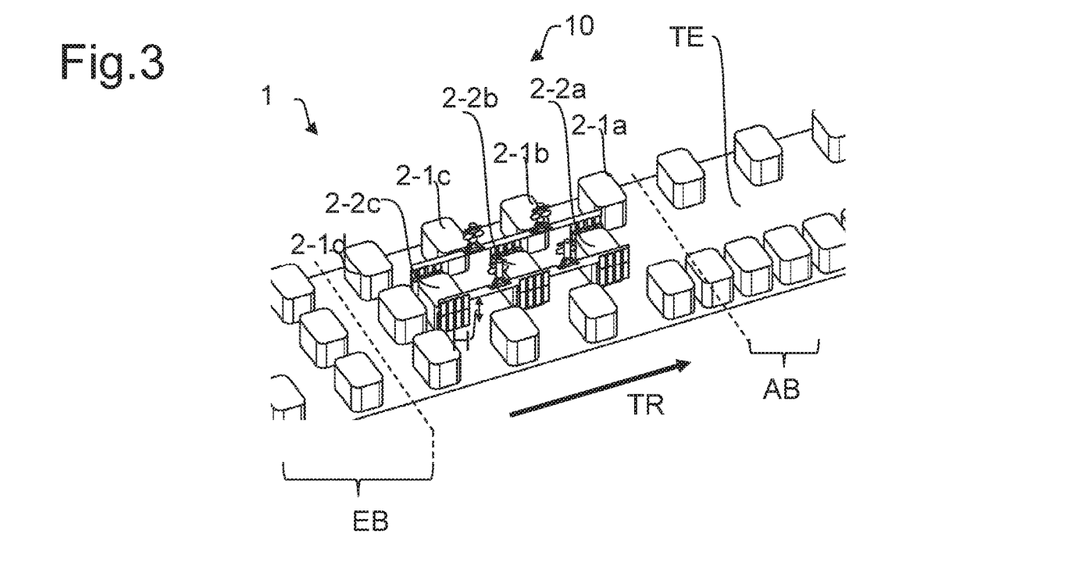
Figure 4:
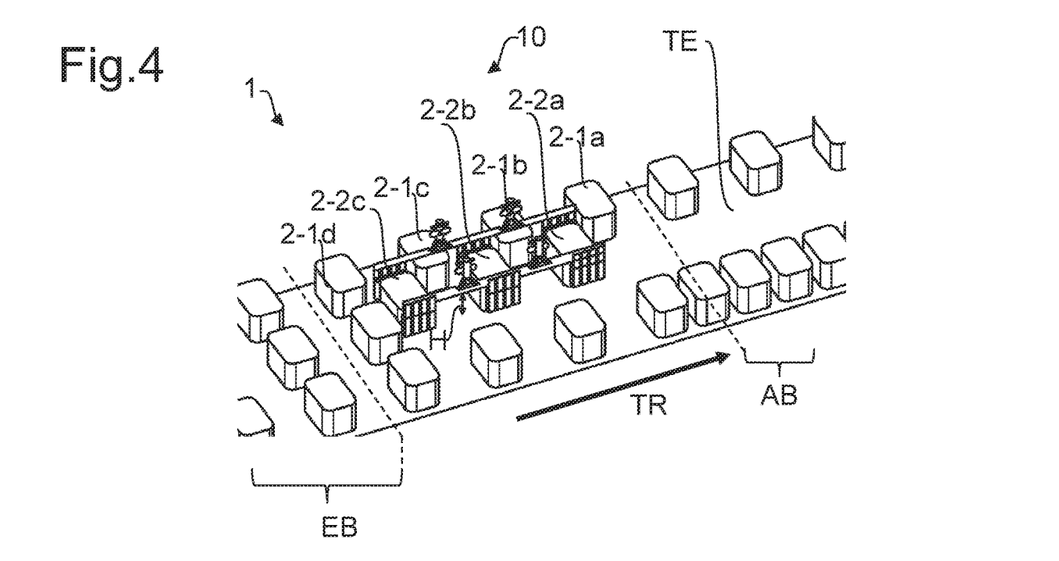
Figure 5:
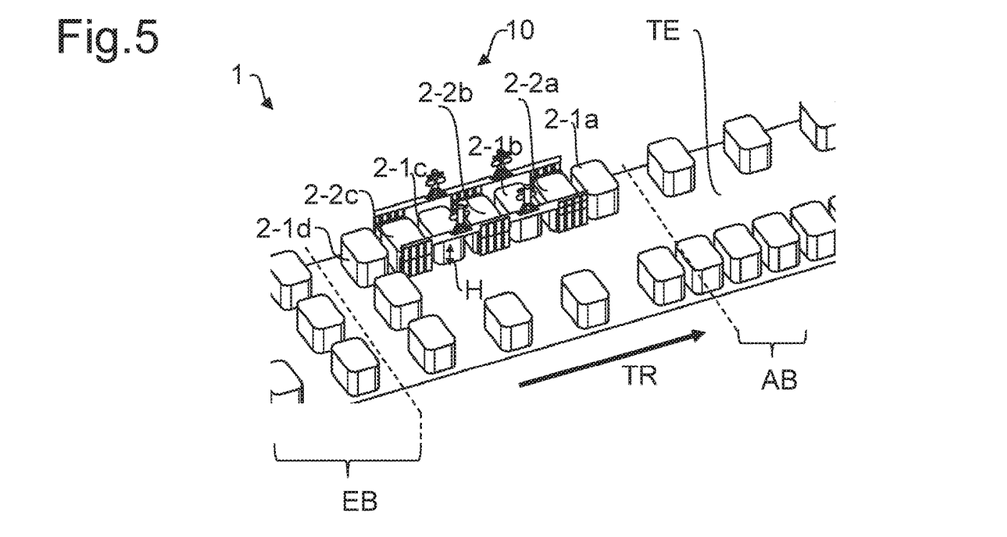
Figure 6:
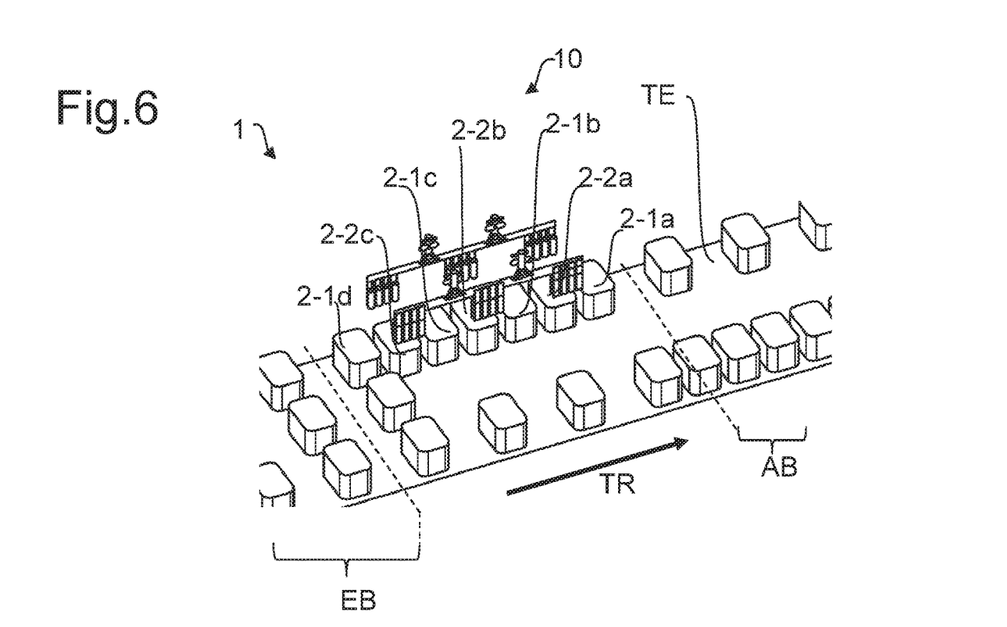
Figure 7:
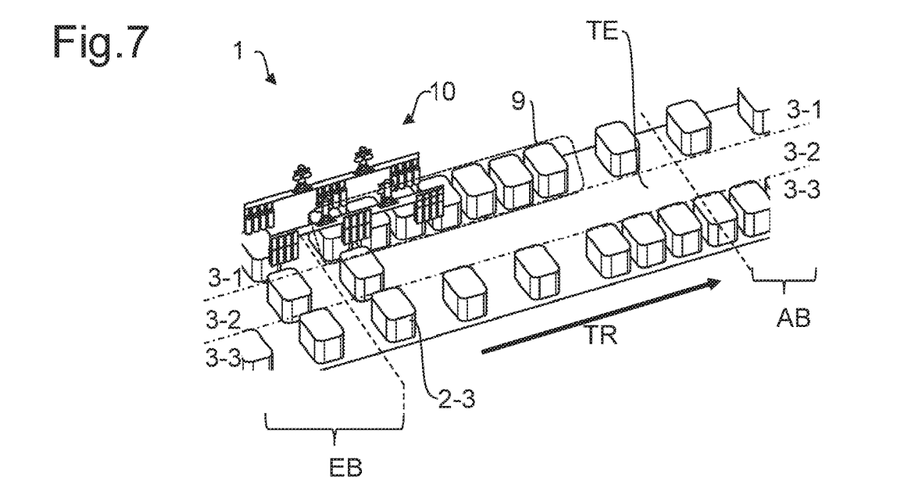

In a so-called exit area AB of the handling device 1 disposed downstream from the gripper in transport direction TR, bundles 2 are thus only left in the outer, continuing rows 3-1 and 3-3 of bundles 2, which can be fed to a further processing device 7 (cf. FIG. 1). By the bundles 2-2 being shifted from the middle row to the outer rows 3-1 and/or 3-3, the middle row 3-2 is thus completely broken up before it enters the exit area AB.

The gripper 10 is always disposed above the bundles 2. The gripping surfaces 12 of the gripper 10 only move downward in those sections where the bundles 2 are to be gripped (cf. FIG. 8). The bundles 2-2 gripped from the middle row 3-2 are inserted into the spaces 8 between the bundles 2-1 of the outer row 3-1 or into the spaces 8 between the bundles 2-3 of the outer row 3-3.

The exemplary embodiment illustrated in the FIGS. 1 to 7 shows how a two-rowed bundle transport is procured from a three-rowed bundle transport. In order to transfer a two-rowed bundle transport, for example, to a one-rowed bundle transport, the bundles from the row to be broken up are inserted into corresponding spaces between the bundles of the continuing transport row. That is to say that the corresponding gripper always shifts the bundles from the row to be broken up to the same side, rather than shifting them alternately to the right or to the left side.

Figure 8:
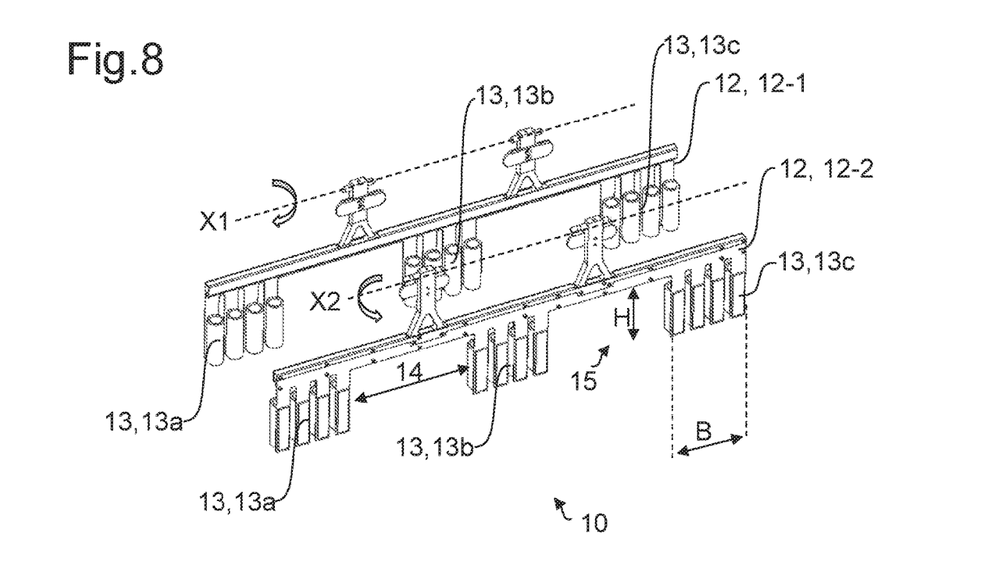
FIG. 8 shows an embodiment of a gripper.

FIG. 8 shows an embodiment of a gripper 10. In particular, the gripper 10 is designed such that it can grip and shift three bundles 2 (cf. FIGS. 1 to 7) simultaneously.

The illustrated gripper 10 has two gripping surfaces 12-1, 12-2 disposed parallel to each other. The gripping surfaces are movable relative to each other. The gripping surfaces 12-1, 12-2 are, for example, each disposed swivelably movable at a swivel axis X1, X2. The swivel axes X1, X2 are each aligned parallel to the transport direction TR of the transport device 4 of the handling device 1 (cf. FIGS. 1 to 7). By swiveling the gripping surfaces 12 about the particular swivel axis X1, X2, the gripping surfaces 12 can be pressed against or moved away from the at least two bundles 2 of the row 3-2 to be broken up (cf. FIGS. 1 to 7).

The gripping surfaces 12 of the gripper 10 are subdivided into three gripping areas 13a, 13b, 13c that are spaced apart from each other. Each gripping area serves for gripping a bundle. The two gripping surfaces 12-1, 12-2 are, in particular, designed to be mirror-inverted to each other such that gripping areas 13a, 13b, 13c are in each instance located opposite each other. Each gripping area 13 has a width B. The width B corresponds to about the longitudinal extent or the length L2 of a bundle 2 in transport direction TR (cf. FIG. 1), for example. A space 14 is formed in each instance between the gripping areas 13a, 13b, 13c of a gripping surface 12. This space 14 corresponds to at least the length L2 of a bundle 2. The space 14 preferably corresponds to the length L8 of a space 8 between two bundles 2 (cf. FIG. 1) and thus preferably amounts to at least 110% of the length L2 of a bundle 2.

The gripper 10 is disposed above the bundle 2-2 arranged in the row 3-2 to be broken up and lowered down to it such that a bundle 2-2 is in each instance disposed between the corresponding gripping areas 13a, 13b, 13c of the two gripping surfaces 12-1, 12-2. In the region of the space 14 between two gripping areas 13, a height H in relation to a transport surface TE of the transport device 5 is formed—see FIGS. 1 to 5. In particular, an opening 15 is defined by the space 14 and the height H, through which opening a bundle 2 can pass from the side.

The gripper 10 grips three bundles 2-2 from the row 3-2 to be broken up. The speed of the bundles 2-2 that are being held by the gripper 10 is thereby reduced in relation to the transport speed of the transport device 5 and thus reduced in relation to the speed of the remaining bundles 2 on the transport device 5. By shifting in a coordinated manner the bundles 2-2 that are being held in a direction of movement that is orthogonal to the transport direction TR, the bundles 2-2 are inserted into the spaces 8 between the bundles 2-1 of the outer row 3-1 or into the spaces 8 between the bundles 2-3 of the outer row 3-3. The openings 15 between the gripping areas 13 of the gripper 10 prevent the bundles 2-1 or 2-3 of the particular outer row 3-1 or 3-3 from colliding with the gripper 10.

The simultaneous transfer of at least two bundles 2-2 from a row 3-2 to be broken up to one of the continuing rows 3-1 or 3-3 is in this context carried out in a continuous manner, that is, without interrupting the transport process. Since at least two bundles are moved simultaneously by only one gripper, the method and the handling device 1 provide time advantages with regard to device requirements in comparison to the known prior art. This also implies a significant reduction in costs. The use of fewer technical means moreover implies less maintenance effort and it reduces the risk of production downtimes.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

1 Handling device
2 Bundle
3 Row
4 Divider device
5 Transport device
6 Conveyor belt
7 Processing device
8 Space
9 Bundle arrangement
10 Gripper
12 Gripping surfaces
13 Gripping area
14 Space
15 Opening
AB Exit area
B Width
EB Entry area
H Height
L Length
TE Transport surface
TR Transport direction
X Swivel axis

The invention claimed is:

1. A method for reducing bundles (2) being conveyed at a transport speed in a transport direction (TR) in n rows (3) to a smaller number of continuing transport rows wherein comprising:
forming a space (8) in each instance at least between the individual bundles (2) of at least one incoming and continuing transport row (3-1, 3-3), wherein the length of the space (8) corresponds to at least the value of a longitudinal extent of an individual bundle (2) in transport direction (TR), and
simultaneously transferring at least two bundles (2) of at least one row (3-2) to be broken up by a gripper (10) into a number of consecutive spaces (8) between bundles (2) of at least one continuing transport row (3-1, 3-3) adjacent to the at least one row (3-2) to be broken up, wherein the number of consecutive spaces (8) corresponds to the number of the bundles (2) being transferred.

2. The method of claim 1, further comprising forming a space (8) in each instance at least between the individual bundles (2) of the row (3-2) to be broken up, wherein the space (8) corresponds to the spaces (8) between the bundles (2) within the at least one incoming and subsequently continuing transport row (3-1, 3-3).

3. The method of claim 2, wherein the transferring step further comprises gripping and shifting simultaneously the at least two bundles (2) of the row (3-2) to be broken up into the corresponding number of consecutive spaces (8) within the at least one continuing transport row (3-1, 3-3).

4. The method of claim 3, further comprising decreasing a movement speed of the at least two bundles (2) of the row (3-2) to be broken up in relation to the transport speed of the bundles (2) of the continuing transport row (3-1, 3-3).

5. The method of claim 4, further comprising moving the at least two bundles (2) of the row (3-2) to be broken up perpendicular to the transport direction (TR).

6. The method of claim 3, further comprising increasing a movement speed of the at least two bundles (2) of the row (3-2) to be broken up in relation to the transport speed of the bundles (2) of the at least one continuing transport row (3-1, 3-3).

7. The method of claim 6, further comprising moving the at least two bundles (2) of the row (3-2) to be broken up perpendicular to the transport direction (TR).

8. The method of claim 3, further comprising moving the at least two bundles (2) of the row (3-2) to be broken up at the transport speed within the at least one continuing transport row (3-1, 3-3).

9. The method of claim 1 further comprising rotating one or more of the at least two bundles being held by the gripper (10) during the transferring step.

10. The method of claim 9 further comprising rotating a plurality of the at least two bundles being held by the gripper (10) independently of each other.

11. A handling device (1) for reducing bundles (2) being conveyed on a transport device (5, 6) at a transport speed in a transport direction (TR) in n rows (3) to a smaller number of continuing transport rows wherein the bundles (2) are disposed to be in each instance spaced apart from each other at least within at least one incoming and subsequently continuing transport row (3-1, 3-3), and wherein at least the spaces (8) between the bundles (2) within the at least one incoming and subsequently continuing transport row (3-1, 3-3) each correspond to at least the value of a longitudinal extent of the bundles (2) in transport direction (TR), wherein the handling device (1) comprises:

a gripper (10) for simultaneously gripping at least two bundles (2) of a row (3-2) to be broken up and transferring the at least two bundles (2) into a number of consecutive spaces (8) between bundles (2) of at least one continuing transport row (3-1, 3-3) adjacent to the row (3-2) to be broken up, wherein the number of consecutive spaces (8) corresponds to the number of the bundles (2) being transferred.

12. The handling device (1) of claim 11, wherein each gripper (10) comprises at least two gripping units for the simultaneous gripping of at least two bundles (2).

13. The handling device (1) of claim 11, wherein the gripper (10) comprises two gripping surfaces (12) disposed opposite each other, between which gripping surfaces (12) the gripped bundles (2) are held, wherein the gripping surfaces (12) are each subdivided into at least two gripping areas (13), and wherein in each instance two gripping areas (13) that are located opposite each other form a gripping unit for an bundle (2), wherein the gripping areas (13) being located directly opposite each other.

14. The handling device (1) of claim 13, wherein the gripping areas (13) are spaced apart from each other, and wherein the space (14) between the gripping areas (13) corresponds to the length of a space (8) between the bundles (2) of the row (3-2) to be broken up.

15. The handling device (1) of claim 14, wherein an opening (15) is formed in the region of the spacing of the gripping areas (13), wherein the size of the opening corresponds to at least a maximum cross section of a bundle (2) in a plane parallel to the transport direction (TR).

16. The handling device (1) claim 13, wherein the gripping surfaces (12) are exchangeable format parts.

* * * * *